US010904008B2

(12) United States Patent
Tomlinson et al.

(10) Patent No.: US 10,904,008 B2
(45) Date of Patent: Jan. 26, 2021

(54) DATA VERIFICATION

(71) Applicant: PQ Solutions Limited, London (GB)

(72) Inventors: Martin Tomlinson, Totnes (GB); Cen Jung Tjhai, London (GB); Andersen Cheng, London (GB)

(73) Assignee: PQ SOLUTIONS LIMITED, London (GB)

( * ) Notice: Subject to any disclaimer, the term of this patent is extended or adjusted under 35 U.S.C. 154(b) by 0 days.

(21) Appl. No.: 16/658,227

(22) Filed: Oct. 21, 2019

(65) Prior Publication Data
US 2020/0119923 A1 Apr. 16, 2020

Related U.S. Application Data

(63) Continuation of application No. 15/729,880, filed on Oct. 11, 2017, now Pat. No. 10,461,936.

(30) Foreign Application Priority Data

May 10, 2017 (GB) .................................. 1707471.7

(51) Int. Cl.
H04L 29/06 (2006.01)
H04L 9/32 (2006.01)
(Continued)

(52) U.S. Cl.
CPC .............. *H04L 9/3231* (2013.01); *G09C 1/00* (2013.01); *H04L 9/0894* (2013.01);
(Continued)

(58) Field of Classification Search
CPC . H04L 9/3231; H04L 63/0492; H04L 9/3242; H04L 9/3213; H04L 63/10;
(Continued)

(56) References Cited

U.S. PATENT DOCUMENTS 7,546,958 B2 * 6/2009 Angelucci ........ G06K 19/06037
235/494
9,582,247 B1 * 2/2017 Milliron .................... G06F 7/02
(Continued)

OTHER PUBLICATIONS

Office Action dated May 26, 2017 as received in GB Application No. 1707471.7.
(Continued)

Primary Examiner — Mahfuzur Rahman
(74) Attorney, Agent, or Firm — Butzel Long

(57) ABSTRACT

Systems and methods for user identity and transaction authentication are described. A user may be authenticated by a terminal configured to process image data of a two-dimensional code to decode key information, the two-dimensional code comprising a cryptographic binding of user credentials including a low-resolution image of the user's face and optionally user biometric data to database user information stored on a secure server. A hash of the two-dimensional code has several digits in common with the hash of the user information stored on the secure server. Authentication may be carried out by computing and comparing the hash values, comparing the high-resolution image of the user's face fetched from the secure server to the user and to the low resolution image embedded in the two dimensional code. The two-dimensional code may be generated to provide access to a restricted area.

36 Claims, 12 Drawing Sheets

(51) Int. Cl.
*G09C 1/00* (2006.01)
*H04L 9/08* (2006.01)
*H04W 12/00* (2009.01)

(52) U.S. Cl.
CPC .......... *H04L 9/3213* (2013.01); *H04L 9/3236* (2013.01); *H04L 9/3242* (2013.01); *H04L 63/0492* (2013.01); *H04L 63/0861* (2013.01); *H04L 63/10* (2013.01); *H04L 9/3247* (2013.01); *H04W 12/00522* (2019.01)

(58) Field of Classification Search
CPC . H04L 9/3236; H04L 9/0894; H04L 63/0861; H04L 9/3247; G09C 1/00; H04W 12/00522
See application file for complete search history.

(56) References Cited

U.S. PATENT DOCUMENTS

| | | | |
|---|---|---|---|
| 10,607,726 B2* | 3/2020 | Lynch | G06F 19/00 |
| 2001/0047476 A1 | 11/2001 | Yen | |
| 2002/0170966 A1 | 11/2002 | Hannigan | |
| 2004/0034783 A1 | 2/2004 | Fedronic | |
| 2005/0004937 A1 | 1/2005 | Colarik | |
| 2011/0007138 A1* | 1/2011 | Zhang | A61C 13/0004 348/50 |
| 2011/0121066 A1 | 5/2011 | Tian | |
| 2012/0008769 A1 | 1/2012 | Collins | |
| 2012/0211561 A1 | 8/2012 | Lieberman | |
| 2013/0094719 A1 | 4/2013 | Haddad | |
| 2014/0181575 A1 | 6/2014 | Kalach | |
| 2014/0279838 A1* | 9/2014 | Tsirogiannis | G06F 16/22 707/603 |
| 2015/0063661 A1 | 3/2015 | Lee | |
| 2019/0340306 A1* | 11/2019 | Harrison | G06N 3/08 |

OTHER PUBLICATIONS

Dominik Klein et al: "A Comparative Study on Image Hashing for Document Authentication", Nov. 20, 2015 (Nov. 20, 2015), XP055497692 (Year: 2015).

* cited by examiner

DATA VERIFICATION

FIELD OF THE INVENTION

This invention relates generally to data processing and more particularly to methods and systems for generating and verifying identification data that is bound to the identity of an authorised owner of the identification data.

BACKGROUND

Secured access control systems are generally known, in which users are issued with a permanent or temporary identification (ID) pass specific to a system. The issued pass is typically presented by the owner wishing to cross a control point, and checked before the user is allowed entry to an associated secured area, building, facility, etc. One conventional form of access control relies on a static form of identification that is printed on the pass, such as the name of the individual and/or a photograph of the user's face. However, such a form of identification is susceptible to fraudulent production and reproduction. Another conventional form of access control relies on machine verification of encoded identifier data. For example, the identifier data may be encoded in a barcode printed on the pass, such as a 1D (one-dimensional) barcode or a 2D (two-dimensional) barcode, commonly referred to as a QR code. As another example, the identifier data may be embedded in an electronic tag, such as a near field communication (NFC) tag identifier or a Radio Frequency Identifier (RFID) tag. However, such machine verification systems do not verify the identity of the person presenting the pass for access.

SUMMARY OF THE INVENTION

An implementation of the disclosed subject matter provides a method that includes receiving, at a processor, code data defining a two-dimensional code including graphical elements representing an image of data to identify a user. The method may include retrieving, at the processor, verification data associated with the user, and calculating a first cryptographic hash value from at least the graphical elements of the image from the received code data. The method may include calculating, at the processor, a second cryptographic hash value from the verification data, and verifying the code data based on a comparison of the first cryptographic hash value with the second cryptographic hash value. A token may be generated by the processor based on the verification to provide access to a security restricted area.

An implementation of the disclosed subject matter provides a method of generating two-dimensional code data that is cryptographically bound to an associated user's verification data. The method includes encoding, at a processor, source data into a two-dimensional code including graphical elements representing an image of data to identify a user. The method may include calculating, at the processor, a first cryptographic hash value from at least the graphical elements representing the image from the received code data. A second cryptographic hash value may be calculated by the processor from the user's verification data. The method may include iteratively altering, at the processor, the verification data and re-calculating the second cryptographic hash value from the altered verification data, until the calculated first and second cryptographic hash values satisfy a defined correspondence relationship. The method may include generating, at the processor, a token to provide access to a security restricted area based on the first and second cryptographic hash values satisfying the defined correspondence relationship.

An implementation of the disclosed subject matter provides a computer-implemented method of verifying a two-dimensional code. The method may include receiving, at a processor, captured image data representing a two-dimensional code, and processing the two-dimensional code to decode data identifying an associated entity. The method may include retrieving, at the processor, verification data associated with the identified associated entity. The method may include calculating, at the processor, a first cryptographic hash value from at least a portion of the received image data, and calculating a second cryptographic hash value from the retrieved verification data. The method may include verifying, at the processor, the two-dimensional code based on a determination that the first cryptographic hash value with the second cryptographic hash value satisfy a defined correspondence relationship. The method may include generating, at the processor, a token to provide access to a security restricted area based on the first and second cryptographic hash values satisfying the defined correspondence relationship.

An implementation of the disclosed subject matter provides a system to generate two-dimensional code data that is cryptographically bound to an associated user's verification data, where the system has one or more processors. The system may encode source data into a two-dimensional code including graphical elements representing an image of data to identify a user. The system may calculate a first cryptographic hash value from at least the graphical elements representing the image from the two-dimensional code data, and may calculate a second cryptographic hash value from the user's verification data. The system may iteratively alter the verification data and re-calculate the second cryptographic hash value from the altered verification data, until the calculated first and second cryptographic hash values satisfy a defined correspondence relationship. The system may generate a token to provide access to a security restricted area based on the first and second cryptographic hash values satisfying the defined correspondence relationship.

In other implementations, there are provided apparatus and systems configured to perform the methods as described above. In a further implementation, there is provided a computer program comprising machine readable instructions arranged to cause a programmable device to carry out the any one of the methods as described above.

BRIEF DESCRIPTION OF THE DRAWINGS

There now follows, by way of example only, a detailed description of implementations of the present invention, with references to the figures identified below.

FIG. 3, which comprises

DETAILED DESCRIPTION

Figure 1:
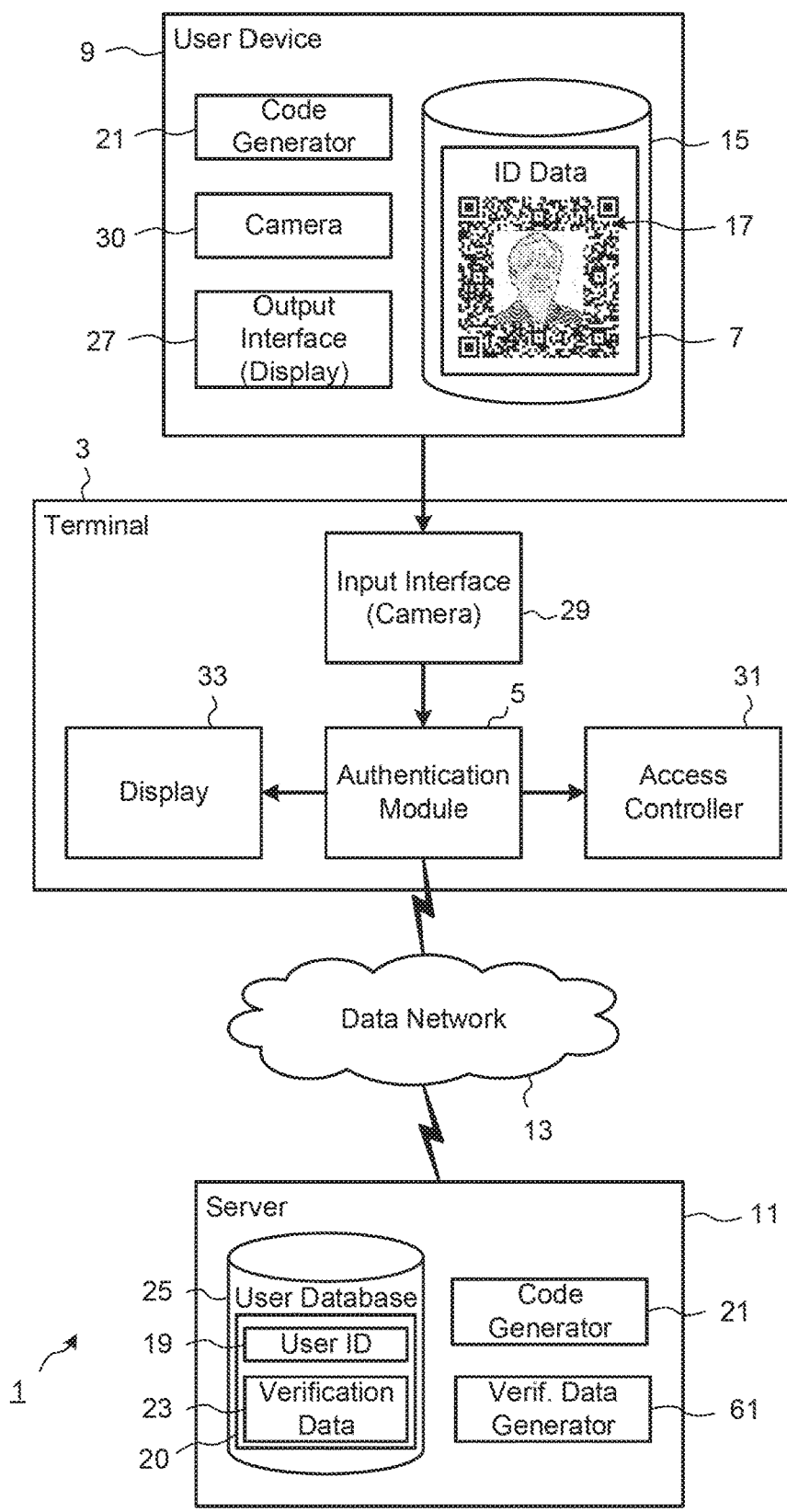
FIG. 1 is a schematic block flow diagram showing the main components of an access control system according to an implementation of the disclosed subject matter.

FIG. 1 shows the main components of an access control system 1 according to an implementation, including a terminal 3 located, for example, at a control point to a security restricted area. An authentication module 5, which in this exemplary implementation is provided at the terminal 3, is configured to verify the authenticity of identification data 7 received by the terminal 3, for example, from a user device 9, which is a computing device of the user. In other implementations, the authentication module 5 may be provided at a remote server 11. The terminal 3 and the user device 9 may be configured for data communication with the server 11 via a data network 13. The identification data 7, which in this implementation takes the form of an electronic pass, is stored in a memory 15 of the user device 9 and includes data defining a two-dimensional (2D) barcode as 2D code 17. The 2D code 17 may be a machine-readable optical label that consists of graphical elements, typically pixels and/or patterns arranged in a square grid. The graphical elements encode source information, such as a user identifier 19 associated with the user to whom the electronic pass was originally issued, who may or may not be the same user presenting the associated identification data 7 to the terminal 3.

As shown in FIG. 1, the 2D code 17 in the present implementations incorporates graphical elements representing a low-resolution image of the user's face. A code generator 21, provided at the user device 9 and/or a remote server 11, is configured to generate the 2D code 17 from the source data, the 2D code 17 incorporating pixel data representing a low-resolution image of the user's face that may be derived from a higher resolution version of the image data. The high-resolution image may be stored as verification data 23 in a secure user database 25 of the server 11, for example as user data 20 associated with the user identifier 19, for subsequent retrieval by the authentication module 5 to verify the authenticity of the identification data 7, as will be described in greater detail below. In some implementations, the high-resolution image data of the verification data 23 is stored in an encrypted form, for example after encryption of the high-resolution image data by a verification data generator 61, using a cryptographic key of the associated user. The verification data 23 may additionally or alternatively include profile data such as biometric signature data associated with the user, e.g. fingerprint, voiceprint, retina/iris scan, etc., and/or visible feature data, e.g. facial characteristics, and/or any other identifying data, e.g. password, PIN, etc. As yet a further alternative, the verification data generator 61 may be configured to generate a modified or altered version of input data, such as the high-resolution image data of the verification data 23 and/or profile data, etc. that encodes or embeds a defined correspondence relationship with the image data of the 2D code 17, such as having common values, or a threshold number of matching values, at defined positions within the respective strings or arrays of data values.

The user device 9 may be configured to output the identification data 7 via an output interface 27 such as a display, whereby the 2D code 17 is presented by the user to a camera of an input interface 29 of the terminal 3. Alternatively, the user device 9 may be configured to transmit the identification data 7 to the terminal 3 via an output interface 27 for data communication, for example using a wireless or contactless data communication protocol. Additionally or alternatively, the identification data 7 may be printed on a physical pass and issued to the user, for presentation to the camera of the input interface 29 at the terminal 3. As yet another alternative, the user device 9 may be an electronic key fob or security token storing the generated ID data 7, configured to transmit the ID data 7 via a data communication output interface 27 to a corresponding data communication interface, such as the input interface 29 of the terminal 3.

Responsive to positive verification, the authentication module 5 may subsequently output a control signal to an access controller 31 of the terminal 3 to allow the authorised user to pass through the control point. The authentication module 5 may output the retrieved version of the user's image to a display 33, facilitating additional manual verification of the user's identity. It should be appreciated that the access control system 1 may include other components, sub-components, modules, and devices commonly found in a computing system/device, which are not illustrated in FIG. 1 for clarity of the description.

Figure 2:
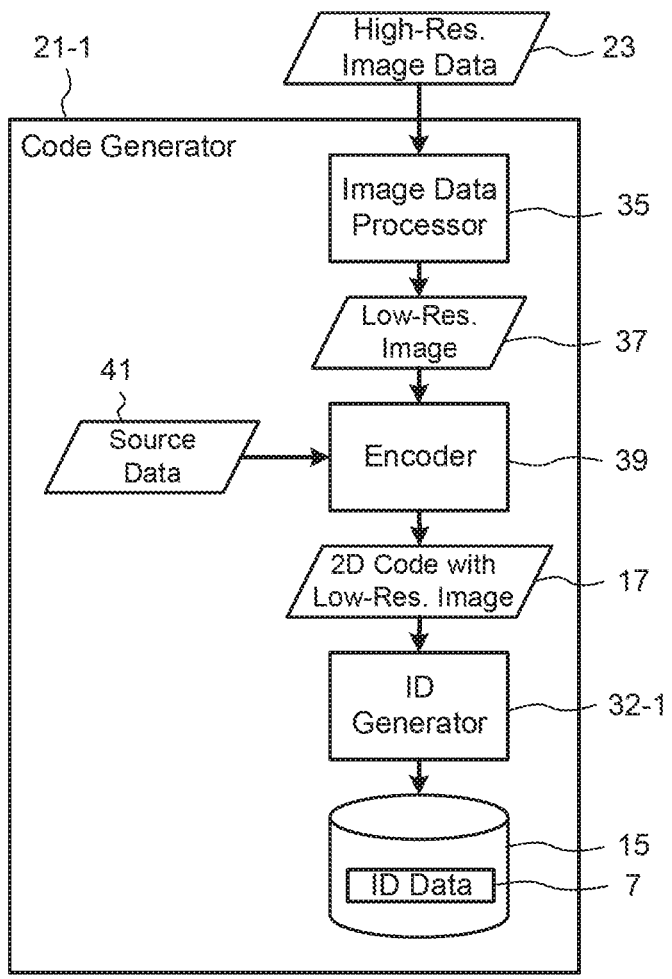
FIG. 2 is a block flow diagram schematically illustrating the main components of a code generator as shown in FIG. 1, according to an implementation of the disclosed subject matter.

One example implementation of a code generator 21-1 for generating the 2D code 17 is schematically illustrated in the block flow diagram of FIG. 2. The code generator 21-1 may be included with and/or substituted for code generator 21 shown in FIG. 1 and described above. In this exemplary implementation, the code generator 21-1 receives image data of the verification data 23 of the user's face, for example as a high-resolution version of the image to be incorporated into the 2D code 17. The high-resolution image data of the verification data 23 of the user's face may be captured by a camera (e.g., camera 30 shown in FIG. 1) of the user device 9. In this example, an image data processor 35 processes the received high-resolution image data of the verification data 23 to generate a lower-resolution version (e.g., lower resolution image 37) of the received image data of the verification data 23.

The lower resolution image may enable the individual pixel sizes to be larger, reducing the possibility of image data capture error when subsequently capturing the image of the two-dimensional code using a scanner or camera. As an alternative, the lower resolution image 37 may be protected by an error correcting code, where the associated parity/error-correcting symbols are included for example as encoded data in the two-dimensional code itself, and/or present as additional/supplemental image data, for example as one or more rows of pixel values following the lower-resolution image or the two-dimensional code itself. Auxiliary data such as image supporting data may also be present in one or more rows of pixel values following the image pixels. Any errors following the subsequent capture of the lower resolution image 37 may be corrected by the error correcting code, using one or more of the decoded, captured, parity, and/or error-correcting symbols. The art of error correction using error correcting codes is well known per se, and need not be described further.

The code generator 21-1 includes an encoder 39 implementing any known algorithm for generating 2D code elements from input source data 41. The 2D code 17 may be generated to include one or more types of source data, such as the user identifier 19, data associated with a transaction, data representing a calculated cryptographic hash value, an authentication token, a cryptographic key, a digital signature, etc. As is known in the art, redundancy in the 2D code is typically provided, enabling recovery of the original data despite corrupted scanned and/or captured 2D code data. For example, using a Reed-Solomon code set at a level H defines a corresponding maximum amount data corruption and/or loss that can be recovered, such as 30%. In this exemplary implementation, the encoder 39 is configured to determine and insert a corrupted 2D code area that is subsequently occupied by the generated lower resolution image 37. Alternatively, other algorithms are known for generating 2D code elements directly from the input source data 41 and the original, e.g. high-resolution, image data of the user's face, whereby the source data is at least partially encoded into the graphical elements representing the image of the user's face in the resulting 2D code 17.

The generated 2D code 17 is passed to an ID generator 32-1 of the code generator 21-1 of the user device 9, to generate data defining the identification data 7, including the generated 2D code 17 data. In some implementations, part or all of the code generator 21-1 and/or ID generator 32-1 functionality may be provided at the remote server 11. The identification data 7 may be stored in the memory 15 of the user device 9, for subsequent retrieval and output, for example on a display 27 of the user device 9 for capture by the camera of the input interface 29 of the terminal 3.

Figure 3A:
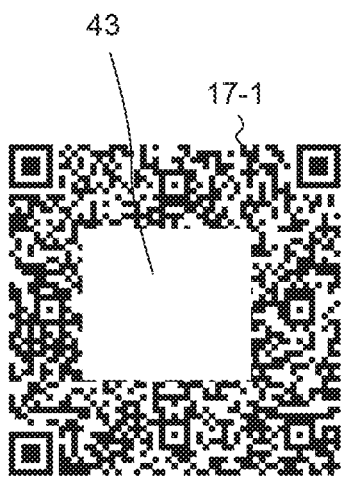
FIGS. 3A to 3C, shows one example of a 2D code generated by the code generator shown in FIG. 2.
Figure 3B:
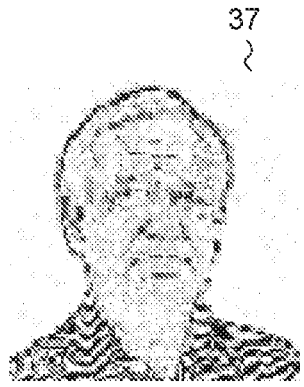
Figure 3C:

FIG. 3, which comprises FIGS. 3A to 3C, shows one example of the 2D code 17 generated by the code generator 21-1. Firstly, a blank rectangle, having an area corresponding to or less than the maximum amount of recoverable data loss, is inserted into the 2D code 17-1, as shown in FIG. 3A. A lower resolution version 37 of the high resolution user image of the verification data 23 is obtained by the image data processor 35, for example by scaling and grey level quantisation, as shown in FIG. 3B. The lower resolution image 37 is inserted or placed into the blank rectangle of FIG. 3A, to produce the output result of a 2d code 17-2 shown in FIG. 3C. Preferably, a marker or demarcation such as a border of white pixels is also inserted to the 2D code 17-1, for ease of subsequent image processing to extract the data of the lower resolution image 37 from the captured data of the 2D code 17. The code generator 21-1 may perform a check that the generated 2D code 17 can be correctly read by a 2D code reader and that the original data decoded and recovered without error.

There may be a number of known alternative methods of inserting images into 2D codes, for example as described in "Half Tone QR Codes", Chu et al, ACM Transactions on Graphics, Vol. 32, No. 6, Article 217a, November 2013. It is also appreciated that implementations of the disclosed subject matter may typically be a closed, proprietary system in which the 2D code 17 is generated and read within the system. In such cases, it is advantageous to use a custom QR code format whereby QR code data is restricted in area or otherwise encoded so that there is no interference from the low resolution image data. The resulting QR code may not be able to be read by a standard QR code reader but that is of no consequence within the closed system and can be an advantage.

Figure 4:
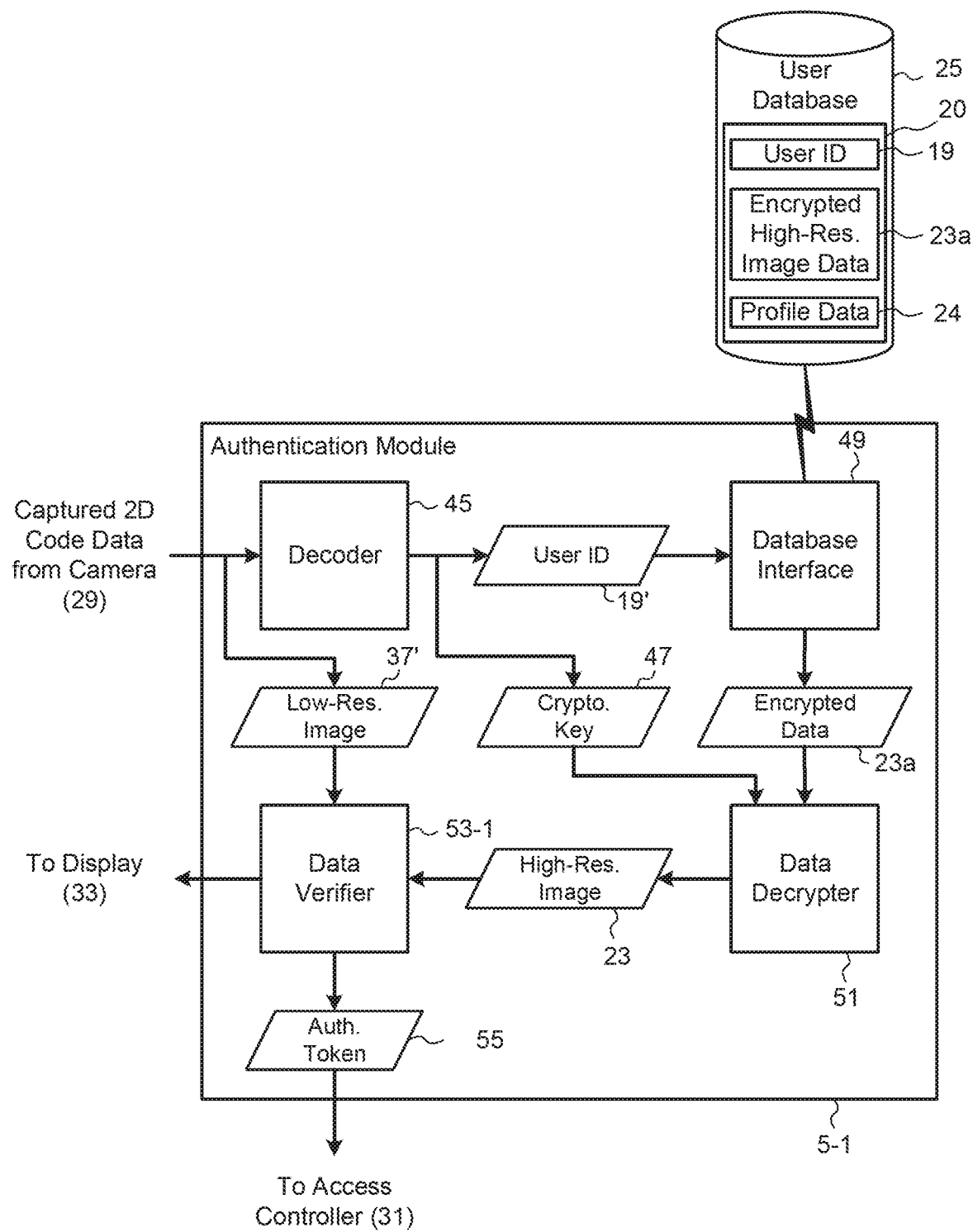
FIG. 4 is a block flow diagram schematically illustrating the main components of the authentication module shown in FIG. 1, according to an implementation of the disclosed subject matter.

FIG. 4 is a block flow diagram showing the main data processing components and flows of an authentication module 5-1 according to an exemplary implementation. The authentication module 5-1 may be similar to the authentication module 5 of the terminal 3 shown in FIG. 1 and discussed above. The authentication module 5-1 includes a decoder 45 that receives data defining the 2D code 17, for example 2D code image data as captured from the display 27 of the user device 9 by the camera of the input interface 29 of the terminal 3. In this implementation, the 2D code 17 encodes source data including a user identifier 19 and a cryptographic key 47 associated with the user. The decoder 45 processes the received 2D code 17 data to decode data identifying the cryptographic key 47 and the user identifier 19. The decoded user identifier 19' may correspond to registered user data 20 stored in a user database 25 if the identification data 7 is authentic. The stored user data 20 also includes an encrypted image data 23a of the user's face (e.g., encrypted high resolution image data of a user's face), encrypted using the user's cryptographic key 47. The high-resolution image data of the encrypted image data 23a may also be digitally signed, for example using an RSA or DSA key, to prove authenticity and to prevent any fakes or substitute images being deployed by adversaries. The user data 20 may also include profile data 24 for each registered user in the user database 25, including for example biometric profile data defining one or more recognisable visible characteristics of the user's face. The user database 25 may be a relational database; however, any other type of data organizational structure may be used.

The decoded user identifier 19' is transmitted to a database interface 49, which retrieves the encrypted image data 23a of the corresponding user data 20 from the user database 25. The user database 25 may be provided in a local memory of the terminal 3, or as a secured database on the remote server 11 that is accessible by the database interface 49 via the data network 13 (e.g., as shown in FIG. 1). For example, a secure communications protocol such as TLS or SSL may be implemented by the database interface 49 to retrieve the image data in encrypted form from the secure user database 25 to a data decrypter 51. The data decrypter 51 processes the retrieved encrypted image data 23a to decrypt the high-resolution image of the verification data 23 of the user's face, using the decoded cryptographic key 47. A data verifier 53-1 receives the captured image data of the 2D code 17 including the low-resolution image 37' of the user's face, and also receives the decrypted high-resolution image data of the verification data 23 of the user's face from the data decrypter 51. The data verifier 53-1 processes the received captured image data to locate and extract the pixels corresponding to the low-resolution image 37' of the user's face, for example by determining the marker or demarcation inserted to the 2D code 17. Any pixel errors may be corrected using an error correcting code, for example if parity symbols are present in the captured image data and/or decoded data.

The data verifier 53-1 in this exemplary implementation also performs data processing to verify that the received data of the low-resolution image 37' corresponds to the retrieved and decrypted high-resolution image data of the verification data 23 of the user's face. For example, the data verifier 53-1 may perform facial recognition processing on both images to verify that identified features/characteristics match the user's profile data 24 retrieved from the user database 25. The low resolution image of the user's face present in the 2D code 17 also enables the user or other person to manually check that they have the correct pass before presenting it to the access control system 1. The data verifier 53-1 may also receive image data of the face of the user presenting the identification data 7 to the terminal 3, for example from another camera (not shown) of the terminal 3, and perform image processing on the received image data to detect and verify recognisable visible features of the user's face in the low-resolution, high-resolution and/or captured image data. The data verifier 53-1 may also output the low-resolution and high-resolution image data on the display 33 of the terminal 3, for further manual verification that the user presenting the identification pass 7 is the authorised owner. After positive verification of the received 2D code 17 by the data verifier 53-1, an authentication token 55 may be generated and output, for example to the access controller 31 of the terminal 3. In response, the access controller 31 may generate and output one or more control signals, thereby controlling access by the authenticated/verified user to an associated security restricted area.

Figure 5:
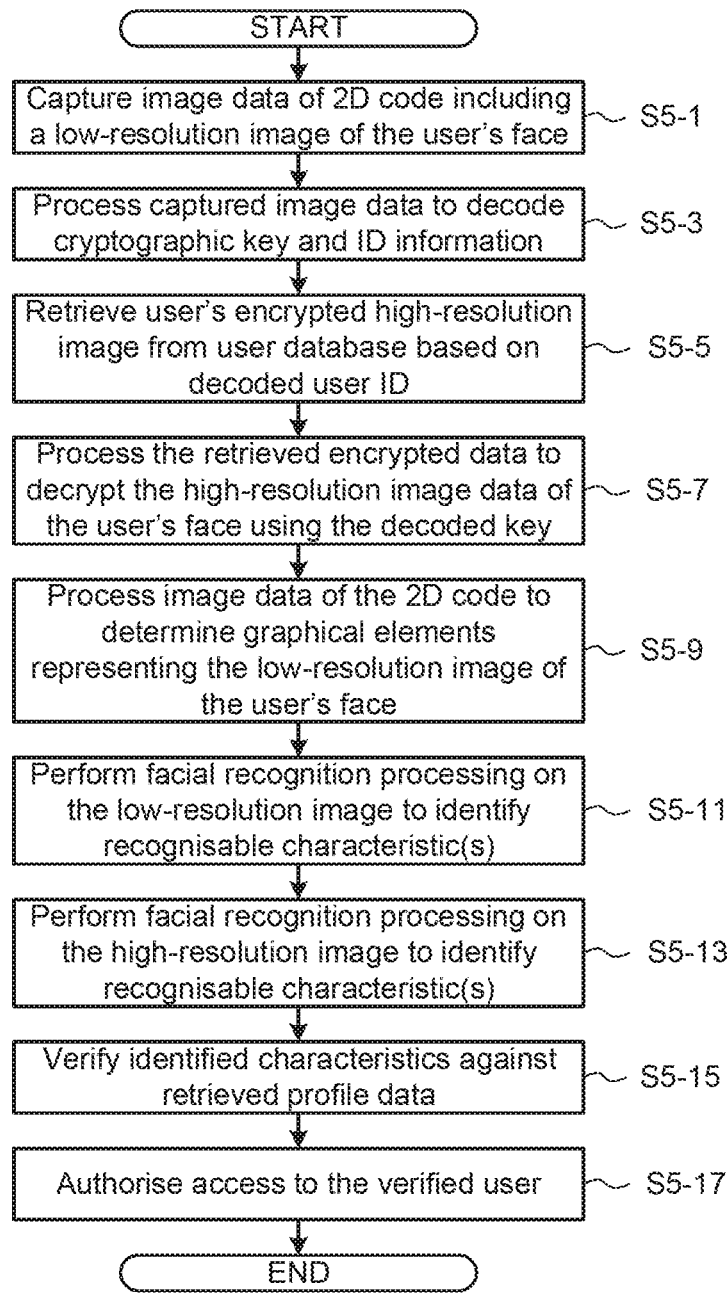
FIG. 5 is a flow diagram illustrating the main processing operations performed by the system components shown in FIG. 1, according to an implementation.

FIG. 5 is a flow diagram of a computer-implemented process of authenticating a user at a terminal, according to an exemplary implementation. As shown in FIG. 5, the process begins at operation S5-1 where the camera of the input interface 29 captures image data of the 2D code 17, for example from the user's identification pass, presented to the terminal 3. In this implementation, the 2D code 17 includes graphical code elements encoding a cryptographic key 47 and a user identifier 19 associated with the user. At least some of the graphical code elements represent a low-resolution image of the user's face. At operation S5-3, the decoder 45 processes the captured image data of the 2D code 17 to decode the user's cryptographic key 47 and user identifier 19 to the decoded user identifier 19'.

At operation S5-5, the database interface 49 retrieves the corresponding user's encrypted image data 23a from the user data 20 stored in the user database 25, for example based on the decoded user identifier 19'. At operation S5-7, the data decrypter 51 processes the data retrieved from the user database 25 to decrypt the high-resolution image data of the verification data 23 of the user's face. The data verifier 53-1 may then process the decrypted high-resolution image data of the verification data 23 and the low-resolution image of the user's face extracted from the captured image data of the 2D code 17, to verify visible characteristics of the user's face in the low- and high-resolution images against the user's profile data 20 stored in the user database 25. For example, as shown at operation S5-9, the data verifier 53-1 processes the captured image data of the 2D code 17 to determine and extract the graphical elements representing the low-resolution image of the user's face. The data verifier 53-1 may be configured to locate a marker or demarcation such as a border of white pixels as inserted to the 2D code 17-1 to determine the area of pixel data containing the low-resolution image 37' of the user's face.

In this example, at operation S5-11, the data verifier 53-1 performs facial recognition processing on the extracted low-resolution image data to identify one or more recognisable characteristics of the user's face. Similarly, at operation S5-13, the data verifier 53-1 performs facial recognition processing on the decrypted high-resolution image data of the verification data 23 to identify one or more recognisable characteristics of the user's face. Suitable feature recognition algorithms are known per se, and need not be described further. At operation S5-15, the data verifier 53-1 verifies the identified characteristic(s) against the user's profile data 24 retrieved from the user database 25. Alternatively or additionally, an operator at the terminal 3 can visually check that the individual in person corresponds to both the high resolution image of the verification data 23 and the 2D code image 17 as output on the display 33 of the terminal 3, as there may not be complete correspondence between individual and the low-resolution 2D code image.

At operation S5-17, the data verifier 53-1 may generate an output signal to authorise access to the verified user, for example to the access controller 31 of the terminal 3. In this way, the access control system 1 advantageously provides a match and/or an irrefutable binding between the low-resolution user image 37' and the high-resolution decrypted user image of the verification data 23, and hence to the individual purporting to be the owner of the associated identification data 7 presented to the terminal 3. It is further appreciated that as the stored high-resolution images are securely stored in the user database 25 in encrypted form, the image data is not readily accessible by a fraudster. Even if a fraudster could learn the encryption keys or authentication process to fraudulently access the access control system 1, reproducing the necessary corresponding hash values is a further obstacle in other implementations, described below.

Figure 6:
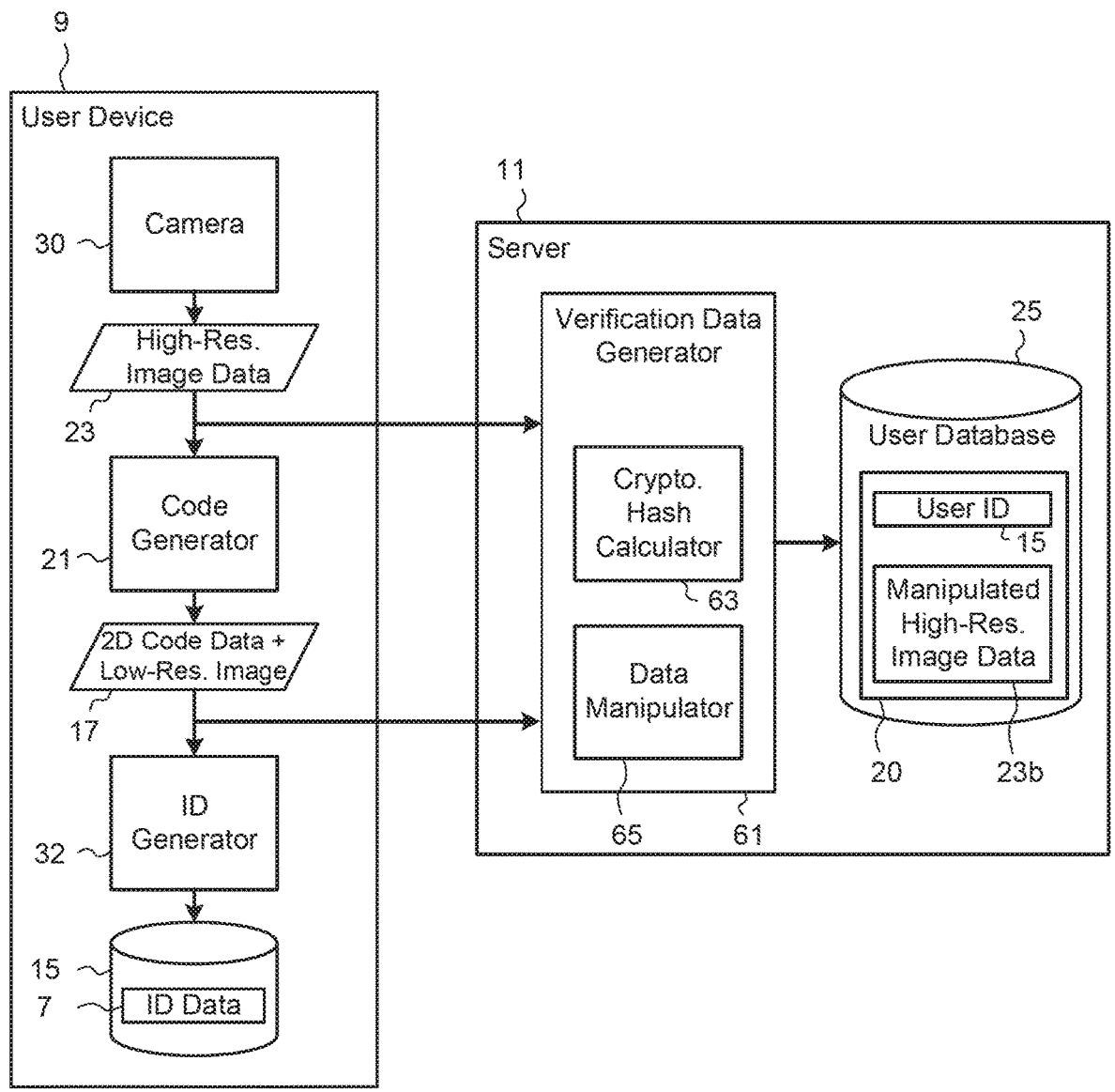
FIG. 6 is a schematic block flow diagram showing the main components of the code generator in the user device and verification data provided in the server as shown in FIG. 1, according to another implementation of the disclosed subject matter.

FIG. 6 is a block flow diagram showing the main components of the user device 9 and the remote server 11 for generating the 2D code 17 according to another implementation, using corresponding reference numerals to those of preceding figures where appropriate for corresponding elements. The code generator 21 is provided at the user device 9 and generates the 2D code 17 including 2D code elements encoding received source data 41, and the lower-resolution image 37 computed from corresponding higher-resolution image data of the verification data 23 for example captured by the camera 30 of the user device 9, as discussed above with reference to FIG. 2.

As shown in FIG. 6, in this exemplary implementation, the higher-resolution version of the user image of the verification data 23 and the 2D code 17 are transmitted by the user device 9 to a verification data generator 61 of the remote server 11, for example via the data network 13. The verification data generator 61 is configured to perform iterative data processing to derive a manipulated version of the received higher-resolution image data 23b having an associated computed cryptographic hash value having corresponding values in common with a cryptographic hash value computed from at least a portion of the 2D code 17, such as the extracted pixel values of the 2D code 17 corresponding to the lower-resolution user image 37. For example, the hash correspondence determiner 61 may repeatedly call a data manipulator 65 to change or alter the higher-resolution image data steganographically and subsequently call a cryptographic hash calculator 63 to calculate the corresponding hash value, until the hash values of both versions of data satisfy a defined correspondence relationship, such as having the desired common values, or a threshold number of matching values at defined positions within the respective strings of data values. The cryptographic hash calculator 63 may implement one or more known cryptographic hash functions, such as the SHA-3 cryptographic hash function, a standard published by the National Institute of Standards and Technology (NIST). The derived manipulated version of the higher-resolution image data 23*b* is then stored as user data 20 in the user database 25, for subsequent retrieval in a corresponding user verification process. An alternative implementation may calculate the hash value of a portion of the 2D code data within the user device 9 and send said hash value to the server 11 instead of the 2D code 17.

Figure 7:
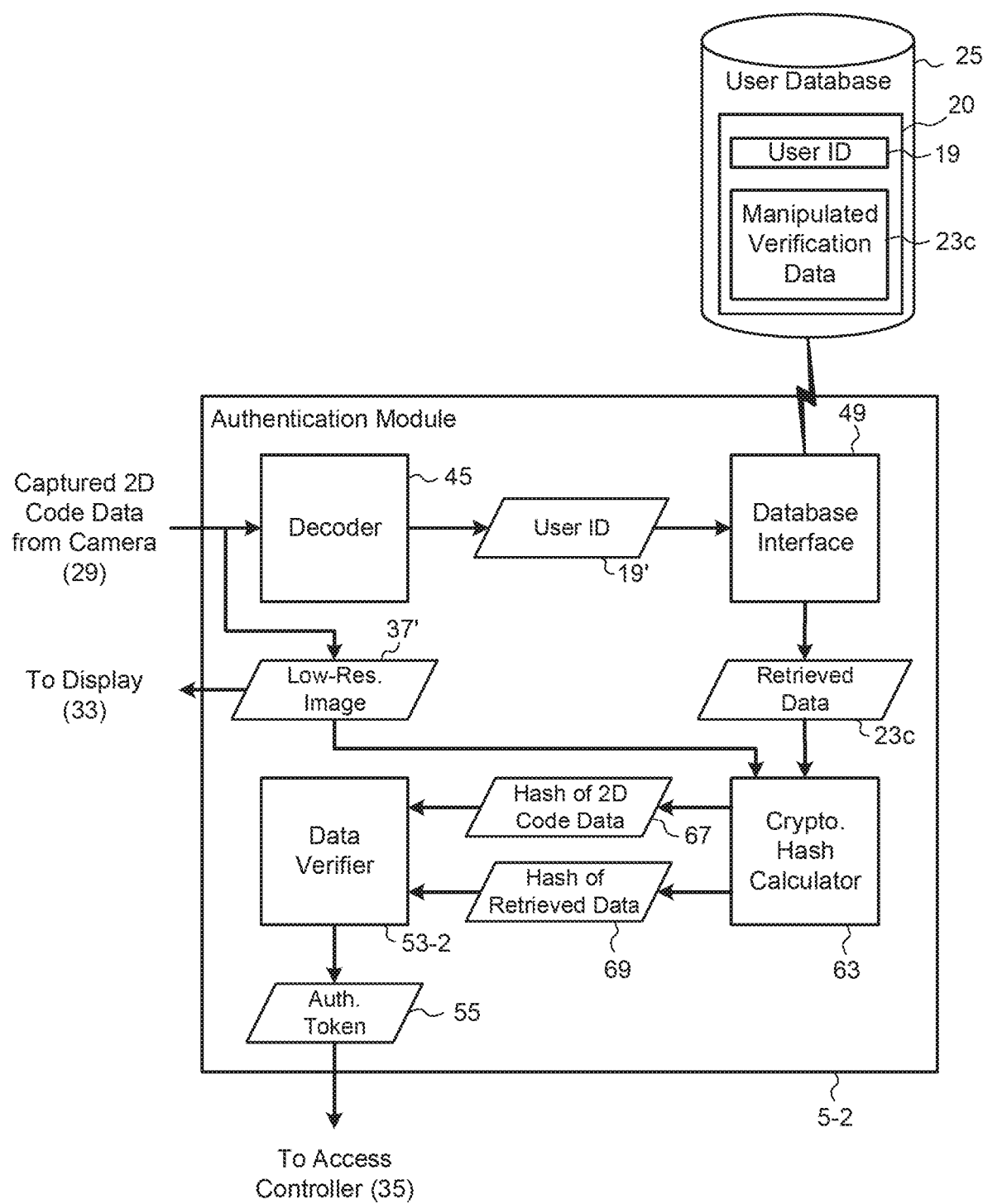
FIG. 7 is a block flow diagram schematically illustrating the main components of an authentication module for verifying a 2D code generated by the code generator shown in FIG. 6, according to an implementation of the disclosed subject matter.

FIG. 7 is a block flow diagram of an authentication module 5-2 according to another exemplary implementation, corresponding to the code generator 21 shown in FIG. 6 and using corresponding reference numerals to those of preceding figures where appropriate for corresponding elements. The authentication module 5-2 may be similar to the authentication module 5 of the terminal 3 shown in FIG. 1 and discussed above. The authentication module 5-2 in this implementation also includes a decoder 45 that receives data defining the 2D code 17, where the 2D code 17 has encoded source data including the user identifier 19 associated with the user. As discussed in the implementations above, the 2D code image data may be captured, by the camera of the input interface 29 of the terminal 3, from the display 27 of the user device 9, by wireless communication or from a physical pass having the 2D code printed thereon. The decoder 45 processes the received 2D code 17 data to decode data identifying the user identifier 19, corresponding to registered user data 20 stored in a user database 25 including the manipulated version of the user's verification data (e.g., manipulated verification data 23*c*), such as the altered higher-resolution image data 23*b* of the user's face output by the data manipulator 65 discussed above with reference to FIG. 6.

The decoded user identifier 19' is transmitted to the database interface 49, which retrieves the manipulated verification data 23*c* of the corresponding user data 20 from the user database 25. The 2D code 17, including the low-resolution image 37' of the user's face, and the corresponding retrieved manipulated verification data 23*c* are passed to a cryptographic hash calculator 63 of the authentication module 5, which corresponds to the cryptographic hash calculator 63 of the verification data generator 61 shown in FIG. 6. The authentication module 5-2 uses the cryptographic hash calculator 63 to calculate a first hash value 67 from the defined portion or whole of the 2D code 17, such as the extracted pixel values representing the low-resolution image 37' as discussed above with reference to the corresponding code generator 21. The specific image resolution of the low-resolution image 37' of the user's face may determine the number of pixel values that are input to the cryptographic hash calculator 63. Preferably, although not necessarily, the image resolution of the low-resolution image 37' of the user's face may be no greater than the capture resolution of a conventional QR code scanning device. The authentication module 5-2 also uses the cryptographic hash calculator 63 to calculate a second hash value 69 from the retrieved manipulated verification data 23*c*. A data verifier 53-2 receives the calculated first and second hash values 67, 69 and performs data processing to identify and verify that the respective hash values have the corresponding values in common, for example, in the defined positions within each string of the calculated hash values as discussed above with reference to the corresponding verification data generator 61. In this way, the data verifier 53-2 of this exemplary implementation verifies that the received data of the low-resolution image 37' of the user's face corresponds to the retrieved higher-resolution image data 23*b* of the user's face, when it is determined that the respective calculated hash values include the embedded correspondence.

After positive verification of the received 2D code 17 by the data verifier 53-2, an authentication token 55 may be generated and output, for example to the access controller 31 of the terminal 3. In response, the access controller 31 may generate and output one or more control signals, thereby controlling access by the authenticated/verified user to an associated security restricted area.

Figure 8:
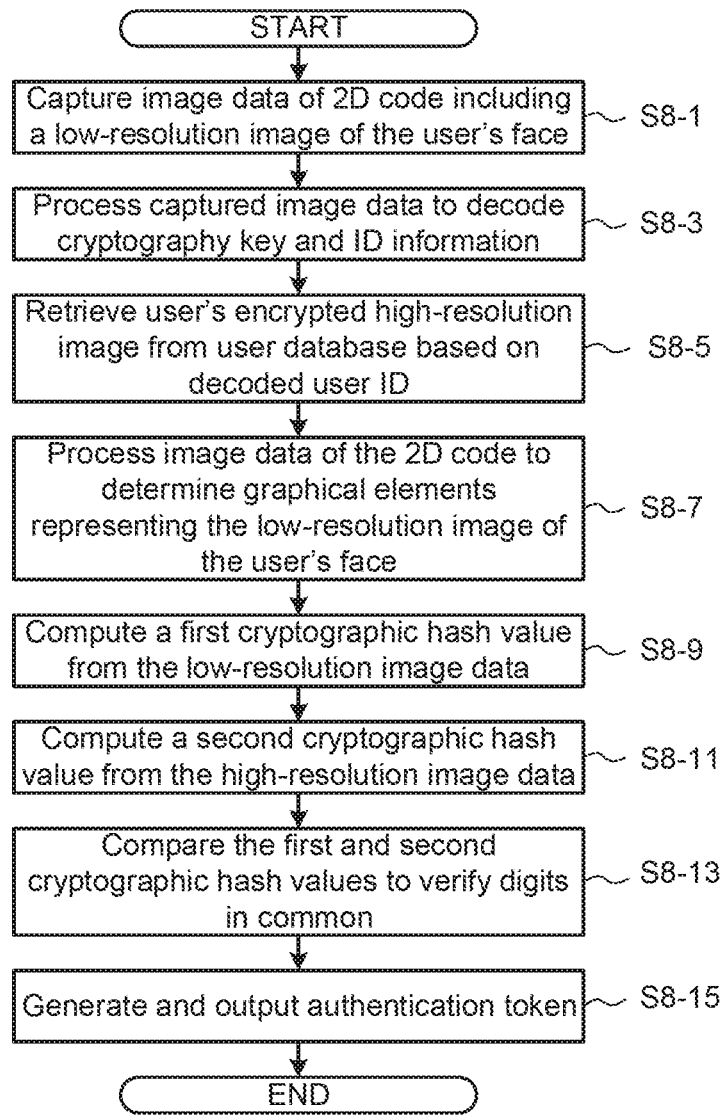
FIG. 8 is a flow diagram of a computer-implemented process of authenticating a user at a terminal using the authentication module shown in FIG. 7, according to an implementation of the disclosed subject matter.

FIG. 8 is a flow diagram of a computer-implemented process of authenticating a user at a terminal using the authentication module 5-2 shown in FIG. 7, according to another exemplary implementation. As shown in FIG. 8, the process begins at operation S8-1 where the camera of the input interface 29 (see, e.g., FIG. 1) captures image data of the 2D code 17, for example from the user's identification pass, presented to the terminal 3, the 2D code 17 including graphical code elements encoding a the user identifier 19 associated with the user. As in the implementations described above, at least some of the graphical code elements represent an image of the user's face, at a low image resolution. At operation S8-3, the decoder 45 processes the captured image data of the 2D code 17 to form the decoded user identifier 19'. At operation S8-5, the database interface 49 retrieves the manipulated version of the user's image (e.g., higher-resolution image data 23*b*), from the user data 20 stored in the user database 25, for example based on the decoded user identifier 19'. As discussed above with reference to the corresponding verification data generator 61 shown in FIG. 6, the manipulated image data (e.g., higher-resolution image data 23*b*) represents the user's image at a higher image resolution than low-resolution image 37' in the 2D code 17.

In this exemplary implementation, the authentication module 5-2 is configured to verify correspondence between respective cryptographic hash values calculated from the received image data and the retrieved server data. Accordingly, at operation S8-7, the cryptographic hash calculator 63 may process the captured image data of the 2D code 17 to determine and extract the graphical elements representing the low-resolution image of the user's face. Similar to the data verifier 53-1 discussed above and shown in FIG. 4, the cryptographic hash calculator 63 of FIG. 7 may be configured to locate a marker or demarcation such as a border of white pixels as inserted to the 2D code 17 to determine the area of pixel data containing the low-resolution image 37' of the user's face. At operation 8-11, the cryptographic hash calculator 63 calculates the first value hash 67 from the pixel values of the area of the 2D code 17 determined to represent the user's face. Alternatively a hash may be calculated from the pixel values of the entire 2D code 17, or a combination thereof. A worked example will now be given, where the hash function used is the SHA-3 cryptographic hash function, having a 256 bit (32 bytes) output. In the present worked example, a 256 bit hash of the lower-resolution image data may be represented in hexadecimal format as:

74a76ed7a52cb5a4b3524c4f0ff5ad5efa89a356e21-ec70e16a37a75462496aa

At operation S8-11, the cryptographic hash calculator 63 computes the second hash value 69 from the retrieved higher-resolution image data 23b. In this exemplary implementation, the original high-resolution image of the verification data 23 of the user's face was subjected to steganographic signal processing by the data manipulator 65 so that the second hash value 69 of the manipulated higher-resolution image data 23b has characters in common with the first hash value 67 computed from the 2D code 17, for example in a defined number of locations within the character string. The low-resolution image 37 in the 2D code 17 may be derived from the high-resolution image of the verification data 23 by using image processing, but this is not essential. Following from the present worked example, the hash value of the steganographically altered higher-resolution image 23b may be represented in hexadecimal format as:

75b6978d787ef28daea0610f1d5856705340397-aff571b52efc57a75462496aa where the last twelve digits of this second hash value 69 correspond to the last twelve digits of the first hash value 67 derived from the corresponding low-resolution image 37' of the user's face. Suitable steganographic algorithms to change pixel values without degrading the image to an unrecognisable form are known per se, for example as discussed in the paper "On the steganography effects in digital images" by F. Marino and G. Mastronardi, and need not be described further. As the changes to the original image are steganographic changes, the image itself may appear to be the same high-resolution image of the individual's face and thus suitable for automatic and/or manual verification of recognisable visible characteristics.

At operation S8-13, the data verifier 53-2 receives and compares the first and second hash values 67, 69 to verify digits in common. Referring to the present worked example, the data verifier 53-2 may compare the first and second hash values 67, 69 to determine that the characters in the corresponding defined locations are the same. At operation S8-15, the data verifier 53-2 may generate and output an authentication token 55, for example to the access controller 31, to authorise access to the verified user.

Numerous alternative implementations to verify correspondence between the two derived hash values (e.g., first and second hash values 67, 69) are envisaged. For example, the hash values may be configured to agree in different positions, not just at the end of the character string as in the example provided above. The correspondence locations may be in variable positions within the character strings, for example in positions defined by a code look up table and/or may be determined from at least part of the hash value derived from the 2D code 17.

As yet another alternative, the high-resolution image need not be modified steganographically to achieve the defined correspondence. Instead, a pseudorandom value may be appended to the high-resolution image data so that the computed hash value of the whole data (i.e. the high-resolution image data and the appended value) has the same predetermined digits in common.

As another alternative, the hash values (e.g., the first and second hash values 67, 69) may be determined by a keyed hash function such as a HMAC (keyed-hash message authentication code) or SHA-3, by key/data input concatenation, using a secret key or a key derived from the 2D code, for example as obtained by AES encryption of the 2D code 17 using a fixed or secret AES key.

As another alternative, the hash digits e.g., the first and second hash values 67, 69) in question need not have an exact correspondence or agreement, and instead may be defined to have a mathematical relationship with each other, purely for example a modulo 2 sum, or a modular sum with a predefined information element, such as the user's name, phone number, URL and/or user biometric data such as a fingerprint, iris scan, etc.

In yet another alternative implementation, implementations of the code generator 21-1 described with reference to FIG. 2 and the verification data generator 61 described with reference to FIG. 6 may be combined, whereby the hash value derived from the 2D code 17 may be used directly or used as input to a keyed pseudo-random function to produce a cryptographic key 47 to decrypt the encrypted image 23a of the individual as stored in and retrieved from the user database 25. In such an alternative, the system may be advantageously configured to provide heightened security policies by avoiding direct exposure of the encryption key, since decoded key information is used to compute or otherwise retrieve an associated cryptographic key from a secure memory or database, and the hash value is not utilised as the authentication instrument to enable access to the encrypted high-resolution image stored by the access control system 1. Alternatively, the access control system 1 may include further security functionality, such as multi-factor authentication which may have the individual to additionally input a PIN, fingerprint or other biometric input.

Figure 9:
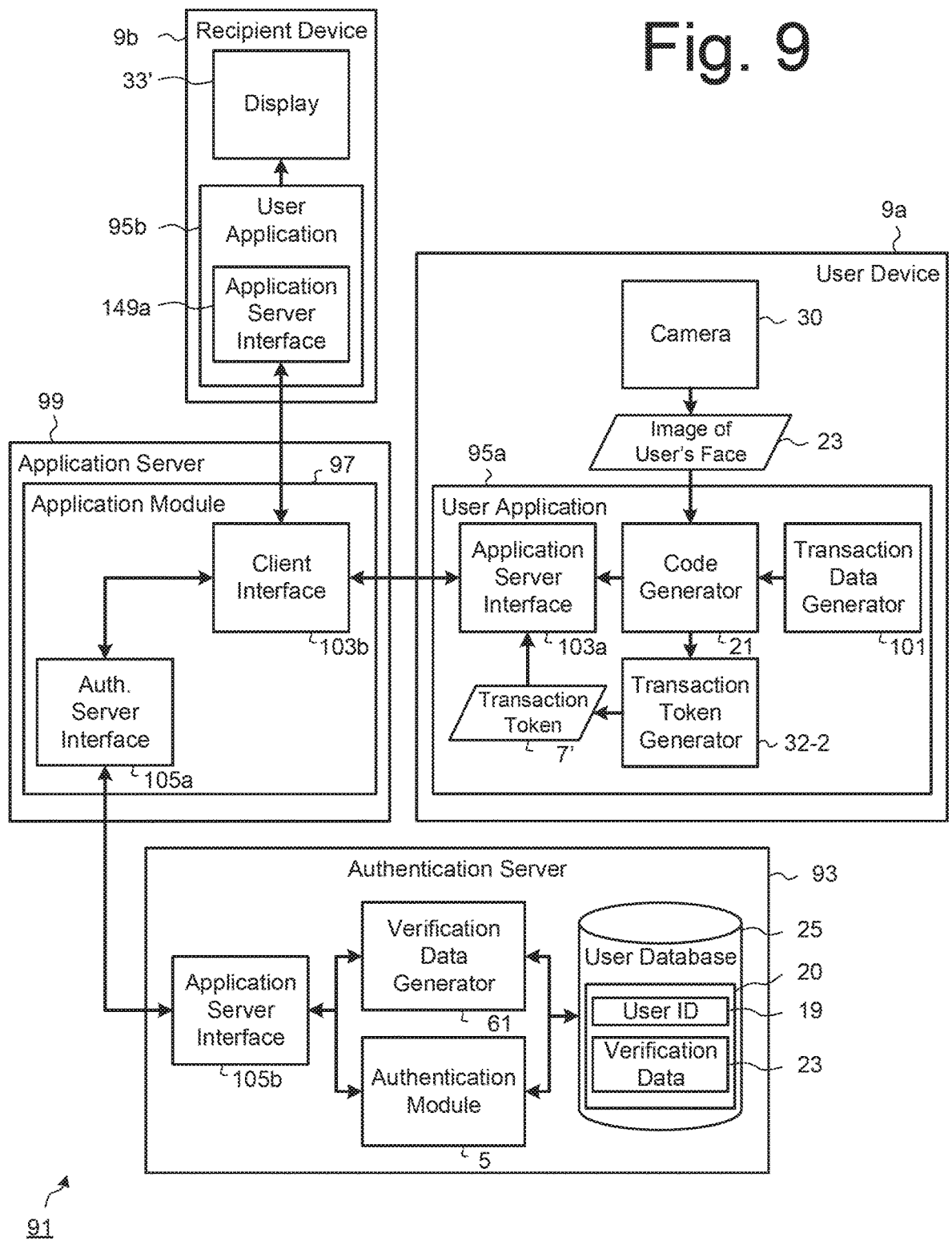
FIG. 9 is a schematic block flow diagram showing the main components of a transaction data processing system according to another implementation of the disclosed subject matter.

Another implementation of the disclosed subject matter will now be described with reference to FIG. 9, using corresponding reference numerals to those of preceding figures where appropriate for corresponding elements, for a system 91 having an authentication server 93 configured to verify the identity of a user initiating, generating or otherwise involved in a transaction via a user application 95a on a user device 9a. In this implementation, the user application 95a is configured to process data relating to a transaction between the user application 95a at the user device 9a and a corresponding user application 95b at a recipient device 9b, for example via an application module 97 of an application server 99. In other implementation contexts, the transaction may be between the user application 95a and the application server 99 itself. Purely by way of example, the user applications 95a, 95b may provide functionality to perform data transfer transactions between respective users, electronic data messaging, peer-to-peer (P2P) payment transactions (which may not use an intermediary application server), or payment transactions from a customer device to a merchant and/or bank computing entity.

In this exemplary implementation, the user application 95a includes a transaction data generator 101 configured to generate transaction data depending on the particular user application implementation context. The generated transaction data is provided as source data 41 to a code generator 21 of the user application 95a, which also receives image data of the user's face from the verification data 23 captured by a camera 30 of the user device 9a, for example, in response to a prompt from the user application 95a while or after the transaction data is generated. As discussed above with reference to FIG. 6, the code generator 21 generates 2D code 17 including 2D code elements encoding the generated transaction data, and the lower-resolution image 37 computed from corresponding higher-resolution image data of the verification data 23. The higher-resolution version of the user image from the verification data 23 and the 2D code 17 are also transmitted by the user application 95a to a verification data generator 61 of the remote server 11, for example, via the application server 99. The user application 95a may also transmit some or all of the generated transaction data to the verification data generator 61. As also discussed above with reference to FIG. 6, the verification data generator 61 performs iterative data processing to derive a manipulated version of the higher-resolution image data 23b and any transaction data received from the user application 95a, the manipulated verification data 23 having an associated computed cryptographic hash value with corresponding values in common with a cryptographic hash value computed from at least a portion of the 2D code 17.

In this implementation, the generated 2D code 17 is passed to a transaction token generator 32-2 of the user application 95a, which generates a transaction token 7' including the 2D code 17, thereby establishing an electronic receipt of the transaction that provides an irrefutable binding of the user who initiated or is associated with the transaction, to the encoded details of the transaction itself. The authentication server 93 is also used to subsequently authenticate the transaction by verifying the identity of the user purporting to be associated with the transaction, for example based on processing of the 2D code 17 from the transaction token 7' by the authentication module 5 at the authentication server 93, as discussed above with reference to FIG. 7.

As shown, the user application 95a is in communication with the corresponding application module 97 of the application server 99 via respective application server and client interfaces 103a, 103b, for example over the data network 13. The application module 97 is also in communication with the authentication server 93 over the data network 13, via respective interfaces 105a, 105b. The interfaces 103a, 103b, 105a, and 105b may include computer executable instructions for the respective applications to establish and transmit data over a transmission path therebetween.

The user device 9a is associated with a registered user of the system 91, the authentication server 93 storing user data 20 identifying each registered user, for example in one or more user databases 25. The user device 9a and the recipient device 9b may each be a desktop computer, laptop computer, a tablet computer, a smartphone such as an iOS®, Blackberry® or Android® based smartphone, a 'feature' phone, a personal digital assistant (PDA), or any processor-powered device with suitable input and display means. A plurality of user devices 9a may be operable concurrently within the system 91.

Figure 10:
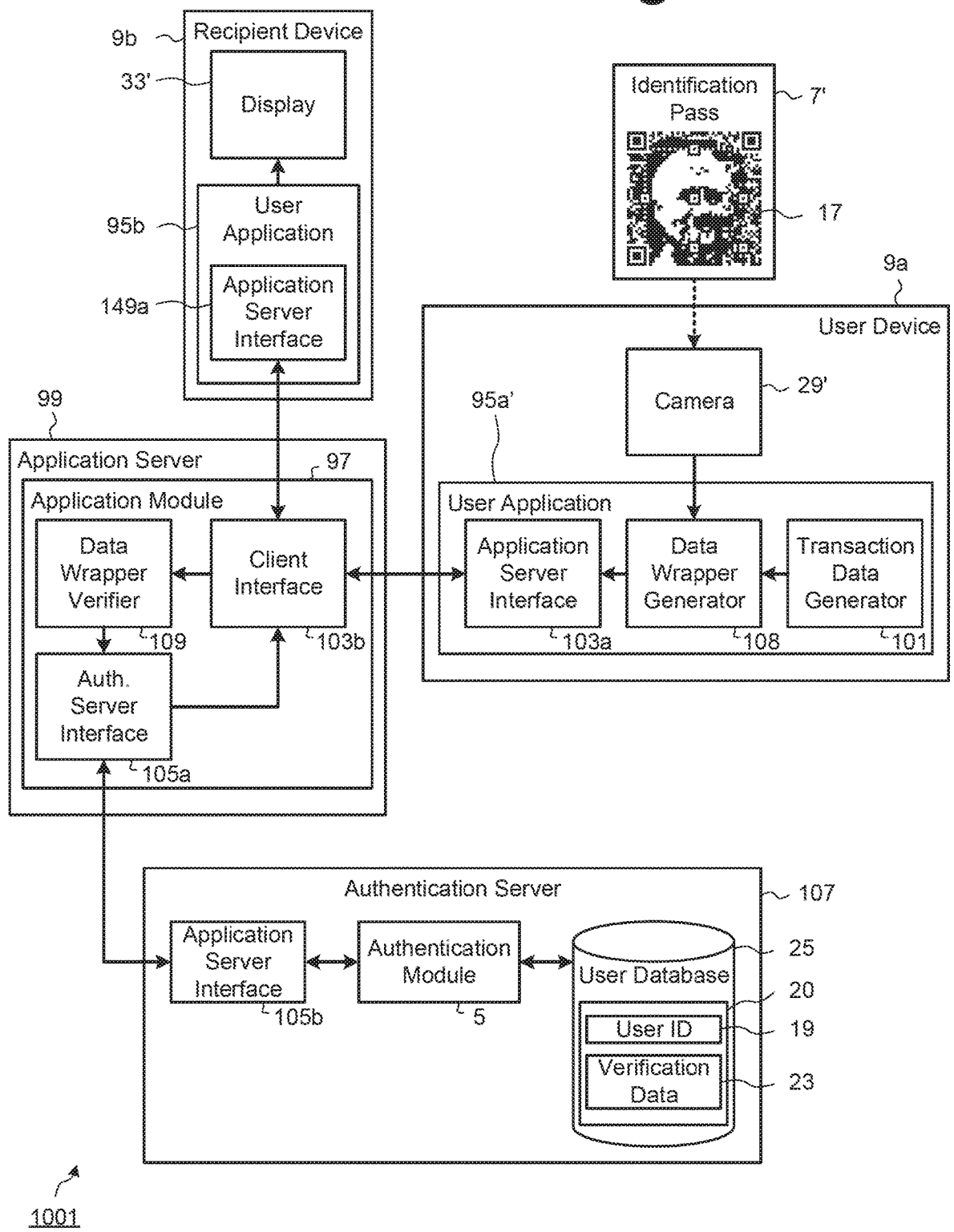
FIG. 10 is a schematic block flow diagram showing the main components of a transaction data processing system according to another implementation of the disclosed subject matter.
Figure 11:
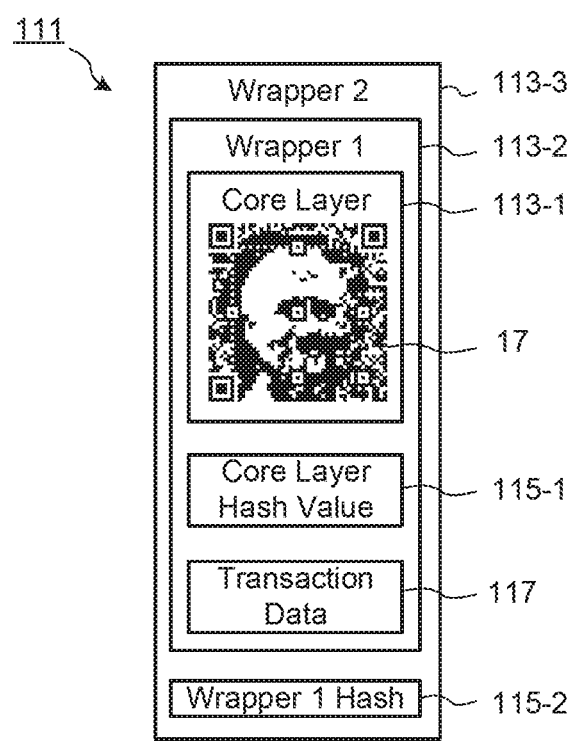
FIG. 11 is a block diagram schematically illustrating an example data structure generated by the system of FIG. 10.

FIG. 10 is a block diagram of a system 1001 according to another implementation, using corresponding reference numerals to those of preceding figures where appropriate for corresponding elements. In this exemplary implementation, the authentication server 107 is also configured to verify the identity of a user initiating, generating or otherwise involved in a transaction via a user application 95a' on a user device 9a. However, instead of generating a transaction token (e.g., transaction token 7') as discussed above with reference to FIG. 9, the user application 95a' in this implementation includes a data wrapper generator 108 that is configured to generate a wrapper data structure 111 (shown in FIG. 11) based on the captured image data of the 2D code 17 and the transaction data output by the transaction data generator 101. FIG. 11 is a block diagram schematically illustrating an example wrapper data structure 111 generated by the data wrapper generator 107. As shown, the data wrapper generator 107 (shown in FIG. 10) inserts the received 2D code 17, including the embedded user's low-resolution photo, into a core layer 113-1 of the wrapper data structure 111. Optionally, additional user data (not shown), such as a password or PIN and/or user biometric data such as a fingerprint or iris scan, may be included with the 2D code 17.

The data wrapper generator 107 computes the first hash value 115-1 from the data in the core layer 113-1, including the image data of the 2D code 17 and any accompanying additional user data. The core layer 113-1, the first hash value 115-1, and the transaction data 117 received from the transaction data generator 101, together form a second layer of the wrapper data structure 111, referred to as the first wrapper layer 113-2 or 'Wrapper 1'. The data wrapper generator 107 computes a second hash value 115-2 from the data of the first wrapper layer 113-2. The computed Wrapper 1 hash value (i.e., the second hash value 115-2) and the data of the first wrapper layer 113-2 itself together form a third layer of the wrapper data structure 111, referred to as the second wrapper layer 113-3 or 'Wrapper 2'. The data wrapper generator 107 may then digitally sign the second wrapper layer 113-3, for example using an RSA or DSA key.

In this exemplary implementation, the wrapper data structure 111 is transmitted to the application module 97 of the application server 99, where a corresponding data wrapper verifier 109 (as shown in FIG. 10) of the application module 97 carries out data processing on the received wrapper data structure 111 to first check that the second wrapper layer 113-3 is intact, by checking the received first hash value 115-1 against a computed hash of the received wrapper 1 data itself. The data wrapper verifier 109 then carries out data processing to check that the first wrapper layer 113-2 is intact by checking the received first hash value 115-1 against a computed hash of the received 2D code 17 itself, along with any accompanying additional user data if present in the core layer 113-1. The data wrapper verifier 109 also extracts the transaction data 117 for subsequent processing depending on the particular implementation context. The data wrapper verifier 109 may transmit the core layer 113-1 to a user application 95b of a recipient device 9b, for output on a display 33' whereby an additional visual check of the embedded low-resolution image can be performed by the recipient user.

In this implementation, the data wrapper verifier 109 also transmits the 2D code 17 of the received core layer 113-1 to the authentication server 107, for processing by an authentication module 5. The 2D code and user identity verification processing by the authentication module 5 is similar to the processing described with reference to FIG. 4 or FIG. 7 in the implementations above. After positive verification by the authentication module 5, an output authentication token 55 may be returned to the application module 97 of the application server 99. Alternatively or additionally, the authentication server 107 may also return a retrieved/decrypted higher-resolution image 23b to the application server 99, for example to be forwarded to the recipient device 9b for output on the display 33' as yet a further manual visual verification.

In this way, the identity verification process involves checks on the first and second wrapper layers 113-2, 113-3 as initiated by the application server 99, and involving subsequent check of the core layer 113-1 by the authentication server 107, to verify that the low-resolution image incorporated into the 2D code 17 could not have been tampered with or fraudulently produced. In response to receiving the authentication token 55 from the authentication server 107, the application module 97 may execute further processing operations to complete the verified transaction, depending on the user application implementation context.

Figure 12:
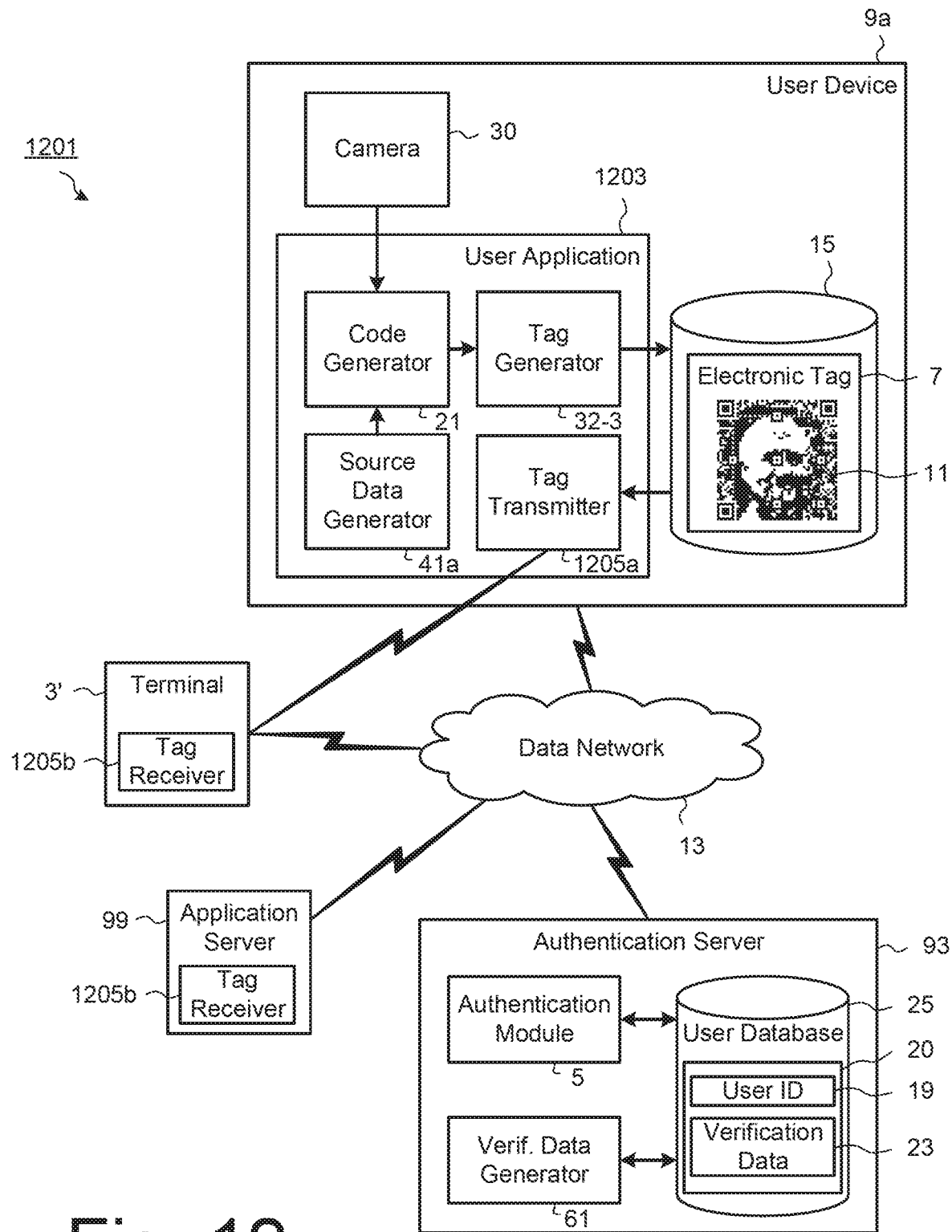
FIG. 12 is a schematic block flow diagram showing the main components of an electronic tag generation and verification system according to another implementation of the disclosed subject matter.

Another implementation of the disclosed subject matter will now be described with reference to FIG. 12, using corresponding reference numerals to those of preceding figures where appropriate for corresponding elements, for a system 1201 configured to generate and verify the authenticated 2D image code in the form of an electronic tag, representing for example an admission ticket or invitation to a forthcoming event such as a concert, hotel reservation, VIP meeting, etc. In this implementation, the procedure is typically initiated by using an application 1203 on user device 9a, such as a smartphone. A code generator 21 of the user application 1203 receives image data of the user's face, captured for example as a high resolution digital photograph by a camera 30 of the user device 9a. The code generator 21 also receives source data 41 generated by a source data generator 41a of the user application 1203, such as transaction data of the event associated with the electronic tag, e.g. user ID and other credentials, event date, place and venue, etc. depending on the implementation context.

As described above with reference to FIG. 2, the code generator 21 generates the 2D code 17 from the received source data 41 and captured image data of the verification data 23, the generated 2D code 17 incorporating pixel data representing a lower resolution image 37 of the user's face that is derived from the received higher resolution image data of the verification data 23. The original high-resolution image is stored as the verification data 23 in a secure user database 25 of the remote authentication server 93, for example, as user data 20 associated with the user identifier 19, for subsequent retrieval by the authentication module 5 to verify the authenticity of the electronic tag 7. In some implementations, the high-resolution image data of the verification data 23 is stored in an encrypted form, using a cryptographic key of the associated user. In other implementations, the verification data may additionally or alternatively include profile data such as biometric signature data associated with the user, e.g. fingerprint, voiceprint, retina/iris scan, etc., and/or visible feature data, e.g. facial characteristics, and/or any other identifying data, e.g. password, PIN, etc., which may be received from the user via suitable input interfaces (not shown) of the user device 9a.

The generated 2D code 17 is passed to a tag generator 32-3 of the user application 1203, to generate data defining the electronic tag 7, including the generated 2D code 17 data. Thus, the 2D code 17 embeds data that binds the user to the event associated with the electronic tag 7. Part or all of the code generator 21 and/or tag generator 32-3 functionality may be provided at the corresponding application server 99 and/or the authentication server 93.

In this exemplary implementation, the authentication server 93 also includes a verification data generator 61, as discussed above with reference to FIG. 6, that is configured to iteratively alter the user's original verification data until the calculated cryptographic hash value from the altered verification data and the calculated cryptographic hash value from the 2D code 17 satisfy a defined correspondence relationship. For example, as discussed in implementations above, iterative image processing may be carried out by a verification data generator 61 provided at the authentication server 93 to derive a manipulated version of the received verification data 23 that embodies the verifiable trait of a corresponding calculated hash value having a defined number, or threshold number, of digits in common with the hash value calculated from the image data of the generated 2D code 17 or electronic tag 7. Alternatively or additionally, the verification data generator 61 may be configured to derive a manipulated version of other forms of original verification data associated with the originating user or entity.

For increased security, the 2D code 17 may include a user issued PIN or information input by the user. The 2D code 17 may also include user biometric input such as a fingerprint. In such alternatives, the hash of the 2D code 17 may be arranged to have digits in common with the hash of the high resolution image plus any user data and/or biometric data stored in the user database 25. This provides a further advantage of preventing fraud for example if the user's device is stolen and the 2D code 17 being presented by a similar looking person at the admission event. Additionally, the captured high resolution image of the verification data 23 as communicated to the authentication server 93 may be processed by the authentication server 5 to compare the received image data of the verification data 23 to other high resolution images of the user stored in the user database 25 for additional user verification.

The electronic tag 7 data may be stored in a memory 15 of the user device 9a, for subsequent retrieval and output, for example on a display (not shown) of the user device 9a for capture by the camera of the input interface 29 of the terminal 3 as discussed in the implementations above. As shown in FIG. 12, in this implementation, the electronic tag 7 is retrieved from the memory 15 by the user application 1203, and transmitted by a tag transmitter 1205a to a corresponding receiver interface 1205b of a terminal 3' and/or the application server 99, for example. The tag transmitter 1205a and receiver 1205b may be configured to communicate data over the data network 13 and/or over a data communication link, for example using radio such as Mobile, Bluetooth® or WiFi® or by near field communications (NFC). The electronic tag 7 with 2D code image 11 is processed by the terminal 3', which in this implementation, communicates the 2D code 11 data to the authentication server 93 for verification by the authentication module 5, as discussed in the implementations above.

Once the electronic tag 7 is validated by the terminal 3', for example including verification by the authentication module 5 of hash values in common between the 2D code 17 from the electronic tag 7 and the corresponding verification data 23, such as the high resolution user image, stored in the user database 25, the terminal 3' may output a validation message along with the high resolution user image on the display of the output interface 27, for additional manual verification for example by an agent of the admission event. Yet further operations of user validation may include the agent requesting a PIN or biometric data input from the user, which may be hashed and combined with the hash of the 2D code 17 for comparison with the hash of the verification data 23 stored in the user database 25.

Example Computer System Implementation

Figure 13:
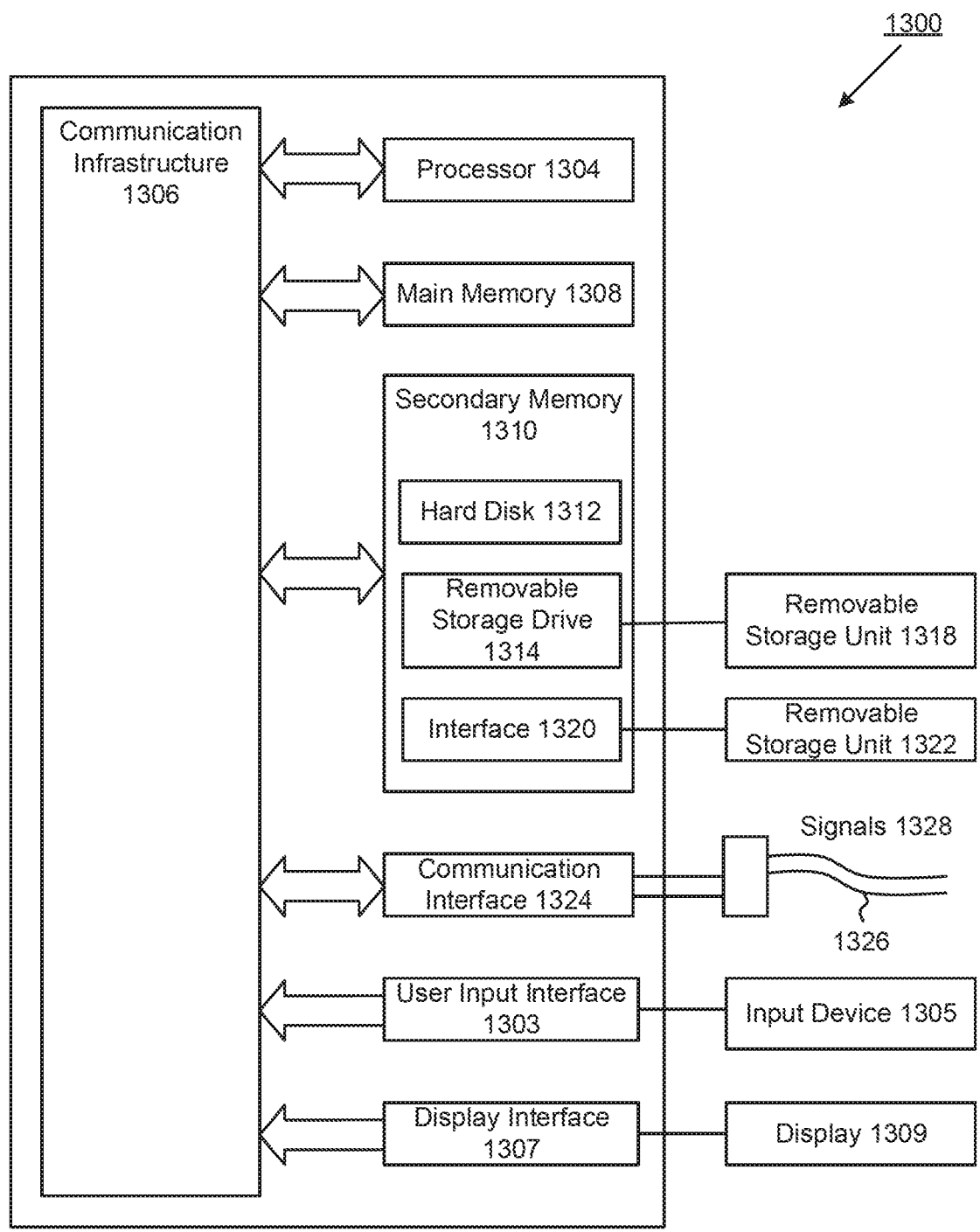
FIG. 13 is a diagram of an example of a computer system on which one or more of the functions may be implemented.

The disclosed subject matter can be implemented by software, firmware, hardware, or a combination thereof. FIG. 13 illustrates an example computer system 1300 in which the implementations of the disclosed subject matter, or portions thereof, can be implemented as computer-readable code. For example, the methods illustrated by the flowcharts of FIGS. 5 and 8 can be implemented in system 1300. The component architectures of the systems and system components shown in FIGS. 1, 2, 4, 6, 7, 9, 10, 11 and 12 can also each be implemented in system 1300. Various implementations of the disclosed subject matter are described in terms of this example computer system 1300. After reading this description, it will become apparent to a person skilled in the relevant art how to implement the disclosed subject matter using other computer systems and/or computer architectures.

Computer system 1300 includes one or more processors, such as processor 1304. Processor 1304 can be a special purpose or a general-purpose processor. Processor 1304 is connected to a communication infrastructure 1306 (for example, a bus, or network).

Computer system 1300 also includes a main memory 1308, preferably random access memory (RAM), and may also include a secondary memory 1310. Secondary memory 1310 may include, for example, a hard disk drive 1312, a removable storage drive 1314, flash memory, a memory stick, and/or any similar non-volatile storage mechanism. Removable storage drive 1314 may comprise a floppy disk drive, a magnetic tape drive, an optical disk drive, a flash memory, or the like. The removable storage drive 1314 reads from and/or writes to a removable storage unit 1318 in a well-known manner. Removable storage unit 1318 may comprise a floppy disk, magnetic tape, optical disk, etc. which is read by and written to by removable storage drive 1314. Removable storage unit 1318 may include a non-transitory computer usable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Communications interface 1324 may include a modem, a network interface (such as an Ethernet card), a communications port, a PCMCIA slot and card, or wireless communications. The communications interface 1324 may receive signals 1328 via a wired and/or wireless communications link 1326.

Computer system 1300 may include a user input interface 1303 to receive user input. In some implementations, the user input interface 1303 may receive user input via an input device 1305 that is communicatively coupled to the user input interface 1303. The user input interface 1303 may receive one or more commands for operation of the computer system 1300.

Computer system 1300 may additionally include computer display 1309. According to an implementation, computer display 1309, in conjunction with display interface 1307, can be used to display interfaces of the terminals, user devices and/or user applications depicted for example in FIGS. 1, 6, 7, 9, 10 and 12.

In this document, the terms "computer program medium," "non-transitory computer readable medium," and "computer usable medium" are used to generally refer to media such as removable storage unit 1318, removable storage unit 1322, and a hard disk installed in hard disk drive 1312. Computer program medium, computer readable storage medium, and computer usable medium can also refer to memories, such as main memory 1308 and secondary memory 1310, which can be memory semiconductors (e.g. DRAMs, etc.). These computer program products are means for providing software to computer system 1300.

Computer programs (also called computer control logic) are stored in main memory 1308 and/or secondary memory 1310. Computer programs may also be received via communications interface 1324. Such computer programs, when executed, enable computer system 1300 to implement the disclosed subject matter as discussed herein. In particular, the computer programs, when executed, enable processor 1304 to implement the processes of the disclosed subject matter, such as the operations in the methods illustrated by flowcharts of FIGS. 5 and 8 and system component architectures of FIGS. 1, 2, 4, 6, 7, 9, 10 and 12 discussed above. Accordingly, such computer programs represent controllers of the computer system 1300. Where the invention is implemented using software, the software may be stored in a computer program product and loaded into computer system 1300 using removable storage drive 1314, interface 1320, hard drive 1312, or communications interface 1324.

Implementations of the disclosed subject matter may be directed to computer program products comprising software stored on any computer useable medium. Such software, when executed in one or more data processing device, causes a data processing device(s) to operate as described herein. Implementations of the disclosed subject matter employ any computer useable or readable medium, known now or in the future. Examples of computer useable mediums include, but are not limited to, primary storage devices (e.g., any type of random access memory), secondary storage devices (e.g., hard drives, USB memory sticks, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, cloud based services, etc.).

FURTHER ALTERNATIVES AND MODIFICATIONS

It will be understood that implementations of the disclosed subject matter are described herein by way of example only, and that various changes and modifications may be made without departing from the scope of the invention.

For example, in implementations described above, in implementations described above, the two-dimensional code comprises graphical elements representing a lower-resolution image of the user's face, and the two-dimensional code is associated with a corresponding higher-resolution image of the user's face stored for example in a secure database of a remote server. The two-dimensional code may include graphical elements representing an image of the user's face and/or any other form of data that can be used to identify the user, such as other visible, distinctive and measurable features of the user, data representing a distinctive characteristic associated with the user, etc.

As another example, in implementations described above, the 2D code encodes key information including a user identifier and a cryptographic key associated with the authorised owner of the identification pass. The encoded key information may not include the cryptographic key itself. Instead, the decoded key information may be used to identify and retrieve the associated user's cryptographic from a secure database, for example based on the decoded user identifier.

As another example, in implementations described above, the terminal includes a camera that captures image data of a 2D barcode from an identification pass presented to the terminal, and the captured image data is processed by a decoder to decode the key information encoded therein. The terminal may instead include a 2D barcode scanner module that captures and decodes the encoded data. As yet another alternative, data defining the 2D barcode may be stored in a memory of an electronic pass and communicated to the terminal via a communication interface, such as wireless or an RFID or NFC interface.

It will be appreciated that although the respective processes and associated processing modules are described as separate implementations, implementations of the described implementations can be combined to form further implementations. For example, alternative implementations may comprise one or more of the authentication module and QR wrapper data structure implementations described in the above implementations.

As yet another alternative, the authentication module or authentication server modules, may be provided as one or more distributed computing modules or processing services on a remote server that is in communication with the other system components via a data network. The authentication module functionality may be provided as one or more application programming interface (API) accessible by an application program executing on a user device or terminal, or as a plug-in module, extension, embedded code, etc., configured to communicate with an application program.

Reference in this specification to "one implementation" are not necessarily all referring to the same implementation, nor are separate or alternative implementations mutually exclusive of other implementations. In particular, it will be appreciated that implementations of the above discussed implementations can be combined to form further implementations. Similarly, various features are described which may be exhibited by some implementations and not by others. Yet further alternative implementations may be envisaged, which nevertheless fall within the scope of the following claims.

The invention claimed is:

1. A method comprising:
   receiving, at a processor, code data defining a two-dimensional code including graphical elements representing an image of one or more visible, distinctive and measurable features of a user to identify the user;
   retrieving, at the processor, verification data associated with the user, the verification data comprising a manipulated version of source data, wherein the source data is a version of the image in the two-dimensional code;
   verifying, at the processor, the code data based on a comparison of a first value computed from at least the graphical elements of the image from the received code data, with a second value computed from the verification data, whereby the first and second values satisfy a defined correspondence relationship; and
   generating, at the processor, output data based on the verification.

2. The method of claim 1, wherein the output data is to determine access rights.

3. The method of claim 1, wherein the graphical elements representing the image of the one or more visible, distinctive and measurable features of the user are derived from a version of the image in the verification data.

4. The method of claim 1, wherein the manipulated version is generated by steganographically altering the image data until the calculated first and second values satisfy the defined correspondence relationship.

5. The method of claim 1, wherein the source data comprises at least one from the group consisting of: user provided information and biometric data associated with the user.

6. The method of claim 1, wherein the source data comprises transaction data associated with the user.

7. The method of claim 1, wherein the correspondence relationship defines digits in common between the first and second values.

8. The method of claim 7, wherein the correspondence relationship defines a mathematical relationship between the digits in common of the first and second values.

9. The method of claim 7, further comprising:
   comparing, at the processor, the first and second values to locate and verify the digits in common.

10. The method of claim 1, further comprising:
    determining, at the processor, a region of the received code data comprising the graphical elements representing the image of the data to identify the user,
    wherein the first value is calculated from data values in the determined region.

11. The method of claim 1, wherein the received code data comprises image data captured from a camera communicatively coupled to the processor.

12. The method of claim 1, further comprising:
    processing, at the processor, the received code data to decode user information.

13. The method of claim 12, wherein the verification data is retrieved from a remote database based on the decoded user information.

14. The method of claim 13, further comprising:
    determining, at the processor, a decryption key based on the decoded user information.

15. The method of claim 13, wherein the decoded user information comprises the decryption key.

16. The method of claim 15, wherein the verification data comprises the image of data to identify the user that is encrypted, and wherein the method further comprises:
    decrypting, at the processor, the received encrypted image of data using the decryption key.

17. The method of claim 1, further comprising:
    performing image processing, at the processor, to verify at least one feature of the image of data to identify the user from a low-resolution image in the two-dimensional code and a high-resolution image in the retrieved verification data.

18. The method of claim 17, wherein the retrieved verification data further includes profile data associated with the user, and wherein the method further comprises:
    verifying, at the processor, the at least one feature against the stored profile data.

19. The method of claim 1, further comprising:
    computing, at the processor, a third value from user provided information or biometric data associated with the user,
    wherein the code data is verified based on comparisons of the first, second and third values.

20. A method of generating two-dimensional code data that is cryptographically bound to an associated user's verification data, the method comprising:
    encoding, at a processor, source data into a two-dimensional code including graphical elements representing an image of one or more visible, distinctive and measurable features of a user to identify the user, wherein the source data is a version of the image in the two-dimensional code;

calculating, at the processor, a first value from at least the graphical elements representing the image from the received code data;

calculating, at the processor, a second value from the user's verification data, wherein the verification data comprises a manipulated version of the source data; and iteratively altering, at the processor, the verification data and re-calculating the second value from the altered verification data, until the calculated first and second values satisfy a defined correspondence relationship.

21. The method of claim 20, further comprising:
adding, at the processor, parity check symbols from at least one from the group consisting of: an error correcting code and auxiliary data associated with the image to the two-dimensional code.

22. The method of claim 21, further comprising:
generating, at the processor, a verifiable data instrument comprising the two-dimensional code.

23. The method of claim 22, wherein the verifiable data instrument is associated with an electronic transaction by the user, and wherein a higher-resolution image of the image of data to identify the user is captured by a camera communicatively coupled to the processor at the time of the transaction.

24. The method of claim 20, wherein iteratively altering the verification data comprises:
manipulating, at the processor, a version of source data, whereby the calculated first and second values satisfy a defined correspondence relationship.

25. The method of claim 24, wherein iteratively altering the verification data comprises:
steganographically altering, at the processor, a higher-resolution image of the image of data to identify the user until the calculated first and second values satisfy the defined correspondence relationship.

26. The method of claim 20, wherein the correspondence relationship defines digits in common between the first and second values.

27. The method of claim 20, wherein the correspondence relationship defines a mathematical relationship between digits of the first and second values.

28. The method of claim 20, wherein the verification data comprises biometric signature data of the user.

29. The method of claim 20, wherein the source data comprises transaction data and a digital image of the user's face.

30. The method of claim 29, wherein the source data further comprises biometric information identifying the user.

31. The method of claim 29, wherein the source data further comprises information known only to the user.

32. The method of claim 20, wherein the binding of the two-dimensional code data to the associated user's verification data is verified by:
retrieving, at the processor, verification data associated with the user;
calculating, at the processor, a first value from at least the graphical elements of the image from the received code data;
calculating, at the processor, the second value from the verification data; and
verifying, at the processor, the code data based on a comparison of the first value with the second value.

33. A data verification system comprising one or more hardware processors configured to:
receive captured image data representing a two-dimensional code including graphical elements representing an image of one or more visible, distinctive and measurable features of the user that can be used to identify a user;
process the two-dimensional code to decode data identifying an associated entity;
retrieve verification data associated with the identified associated entity, wherein the verification data comprises a manipulated version of source data, wherein the source data is a version of the image in the two-dimensional code;
calculate a first value from at least a portion of the received image data;
calculate a second value from the retrieved verification data;
verify the two-dimensional code based on a determination that the first value with the second value satisfy a defined correspondence relationship; and
generate output data to determine access rights based on the verification.

34. A code generation system comprising one or more hardware processors configured to:
encode source data into a two-dimensional code including graphical elements representing an image of one or more visible, distinctive and measurable features of a user to identify the user, wherein the source data is a version of the image in the two-dimensional code;
calculate a first value from at least the graphical elements representing the image from the two-dimensional code data;
calculate a second value from the user's verification data, wherein the verification data comprises a manipulated version of the source data; and
iteratively alter the verification data and re-calculate the second value from the altered verification data, until the calculated first and second values satisfy a defined correspondence relationship.

35. A non-transitory computer-readable medium comprising computer-executable instructions, that when executed, cause a computer to perform steps of:
receiving code data defining a two-dimensional code including graphical elements representing an image of one or more visible, distinctive and measurable features of a user to identify the user;
retrieving verification data associated with the user, the verification data comprising a manipulated version of source data, wherein the source data is a version of the image in the two-dimensional code;
verifying the code data based on a comparison of a first value computed from at least the graphical elements of the image from the received code data, with a second value computed from the verification data, whereby the first and second values satisfy a defined correspondence relationship; and
generating output data based on the verification.

36. A non-transitory computer-readable medium comprising computer-executable instructions, that when executed, cause a computer to generate two-dimensional code data that is cryptographically bound to an associated user's verification data, by:
encoding, at a processor, source data into a two-dimensional code including graphical elements representing an image of one or more visible, distinctive and measurable features of a user to identify the user, wherein the source data is a version of the image in the two-dimensional code;

calculating, at the processor, a first value from at least the graphical elements representing the image from the received code data;

calculating, at the processor, a second value from the user's verification data, wherein the verification data comprises a manipulated version of the source data; and iteratively altering, at the processor, the verification data and re-calculating the second value from the altered verification data, until the calculated first and second values satisfy a defined correspondence relationship.

* * * * *